April 20, 1954     W. R. KEHOE     2,675,826

CONTROLLER HAVING ITS RESPONSE MODIFIED BY MOTOR POSITION

Filed Oct. 4, 1950     2 Sheets-Sheet 1

Inventor
William R. Kehoe
By Ralph Hammar
Attorney

April 20, 1954   W. R. KEHOE   2,675,826
CONTROLLER HAVING ITS RESPONSE MODIFIED BY MOTOR POSITION
Filed Oct. 4, 1950   2 Sheets-Sheet 2

Inventor
William R. Kehoe
By Ralph Hammar, Attorney

Patented Apr. 20, 1954

2,675,826

UNITED STATES PATENT OFFICE 2,675,826

CONTROLLER HAVING ITS RESPONSE MODIFIED BY MOTOR POSITION

William R. Kehoe, Erie, Pa., assignor to American Meter Company, Erie, Pa., a corporation of Delaware Application October 4, 1950, Serial No. 188,340

5 Claims. (Cl. 137—492)

In fluid operated controllers where a control pressure is produced in response to the deviation of a controlled quantity from the operating point, there is a tendency to hunting which has been corrected by "throttling and reset" means modifying the control pressure produced by the controller.

When the control pressure is used to operate a motor to vary the controlled quantity, there is a phenomenon in the nature of hysteresis which inhibits accurate positioning of the motor. Motor hysteresis has been overcome by so-called "positioners" or servo mechanisms fed by the control pressure.

This invention is intended to eliminate the "positioner" for the motor and the "throttling and reset" means in the controller and to achieve the same or better end result by having the "throttling and reset" means operated by the motor position. By this simpler arrangement there is introduced a temporary compensation, by the change in motor position, corresponding to the difference between the measured value of the quantity and the desired or set point of the value of the quantity and this compensation is gradually reduced to zero as the measured quantity approaches the position corresponding to the set point. By having the compensation respond directly to the motor position, the hysteresis is eliminated and the motor can be more accurately positioned with respect to the control impulse. From one aspect the throttling and reset (with or without derivative response) is transferred from the motor operating control pressure to the motor position. This has particular advantages in systems where the chart room is remote from the motor and controlled and in which the controller information is transmitted to the chart room by transmitters. Further objects and advantages appear in the specification and claims.

Figure 1:
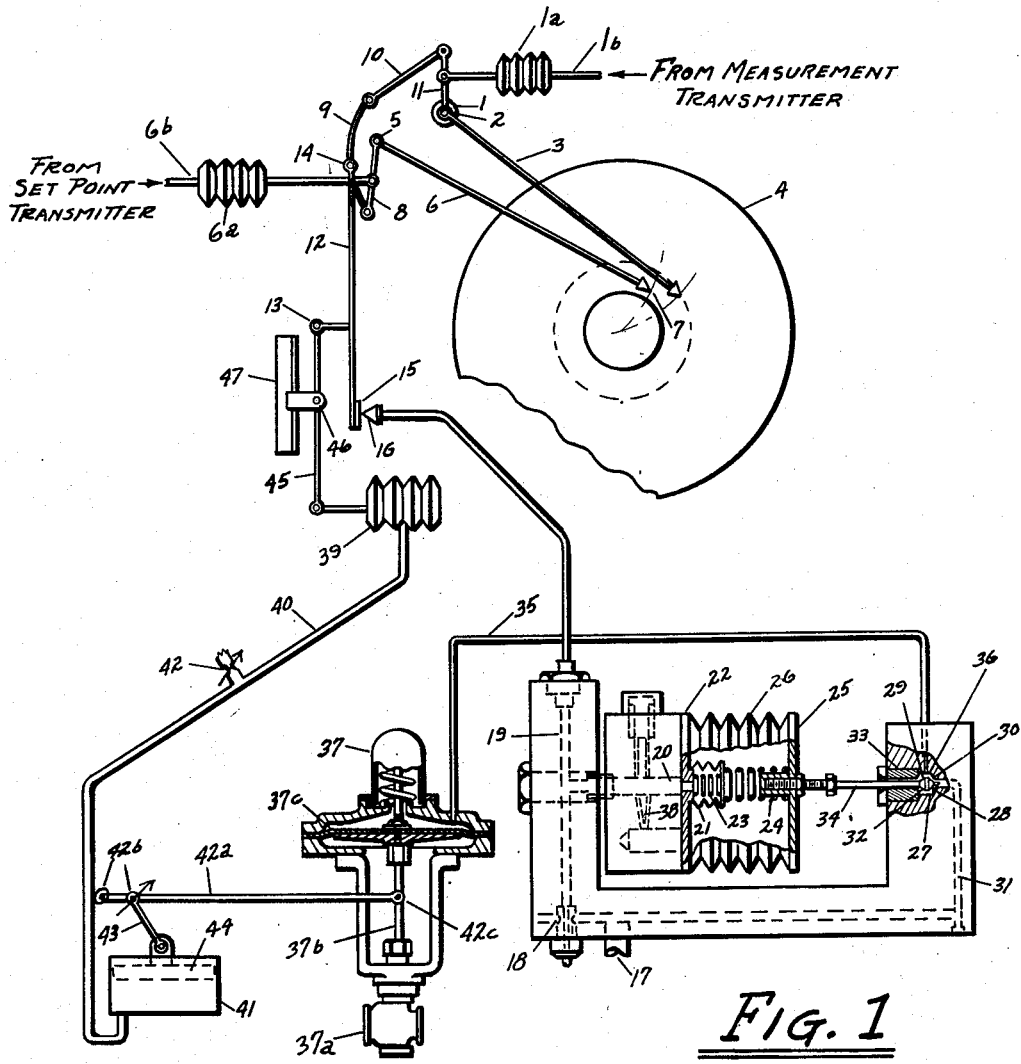
Figure 2:
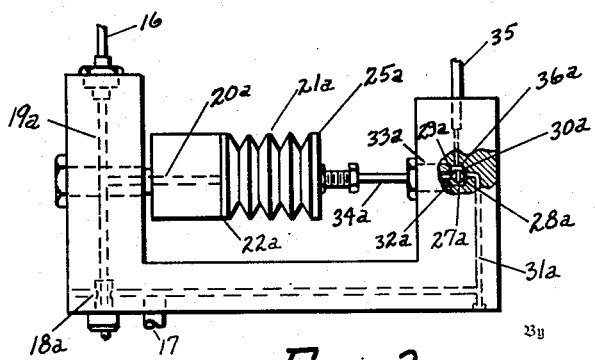
Figure 3:
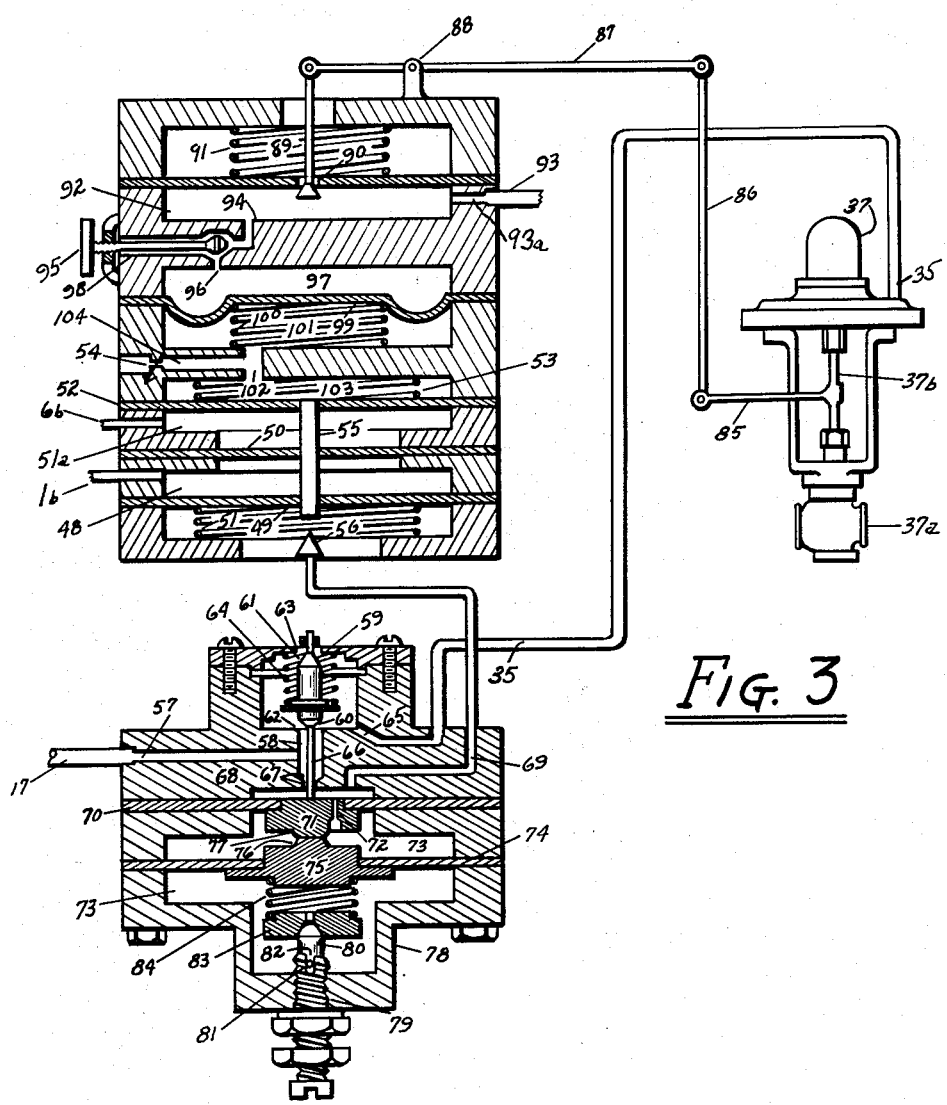

In the drawing, Fig. 1 is a diagrammatic view of a control; Fig. 2 is a section through a less elaborate relay for use in the Fig. 1 control; and Fig. 3 is a section through a modification.

Referring to the drawing, I indicates a sensitive measuring element for the controlled quantity and having a shaft 2 carrying a pen arm 3 for a chart 4. At the same radial distance from the center of the chart as the measuring element is a fixed pivot 5 carrying a bell crank reset lever 6 one arm 7 of which serves as a direct set pointer indicating the desired value of the controlled quantity and the other arm 8 of which is pivoted to one end of a differential lever 9. The opposite end of the differential lever is connected by a link 10 to an arm 11 of the shaft 2. In the balanced position the direct set pointer 7 indicates the same value as the pen arm 3 and the differential lever is parallel to the arm 11 and in line through the pivot 5 so the arm 11, link 10, and differential lever 9 for this position, namely the balanced position, form a parallelogram linkage. The parts are illustrated in an exaggerated off balance position.

Instead of having a sensitive element 1 control the pen arm 3 it is possible to have the position of the pen arm 3 controlled by a bellows 1a connected to the arm 11 on the shaft 2 and fed from a line 1b from a transmitter associated with a remote sensitive element. The pressure in the bellows 1a would at all times correspond to the indication of the sensitive element and accordingly the position of the pen arm 3 would correspond to the measurement information of the controlled quantity as transmitted to the pen arm by the sensitive element transmitter. It is also possible to have a bellows 6a fed from a set point transmitter through a line 6b and connected to the arm 8 of the bell crank lever 6 to position the direct set pointer 7 in accordance with the desired or set point for the controlled quantity. The set point transmitter also could be located remote from the chart.

Whether the pen arm 3 and the direct set pointer 7 are positioned at the chart 4 or by information obtained from transmitters remote from the chart is immaterial. In either case, there is a comparison between the measured value of the controlled quantity and the set point or desired value of the controlled quantity which is utilized to operate the control.

Changes in the value of the controlled quantity are indicated by rotation of the shaft 2 and of the pointer 3 and arm 11 fixed thereto. The movement of the arm 11 is transmitted to the differential lever 9 causing it to pivot about the lower end of the arm 8. The motion of the differential lever is transmitted to a flapper lever 12 pivoted on a pivot 13 and having one end pivoted at 14 to the differential lever 9, and its other end carrying a flapper 15 cooperating with a nozzle 16 supplied from a pneumatic fluid pressure line 17 through a restricted orifice 18 and a passageway 19. The pressure in the passageway 19 varies directly with the position of the flapper, increasing as the flapper approaches and decreasing as the flapper recedes from the nozzle. The orifice 18 so restricts the flow that the variations in pressure in the passageway 19 do not materially vary the quantity of fluid flow.

The pressure in passageway 19 is fed through a way 20 to the interior of a bellows 21 carried by a rigid wall 22 and loaded by a compression spring 23. The bellows 21 acts through a relatively light coupling spring 24 attached to the free end plate 25 of an enclosing bellows 26 also carried by the rigid wall 22. The end plate 25 carries a valve 27 having oppositely facing conical faces 28 and 29 respectively cooperating with a seat 30 in a way 31 leading from the fluid pressure supply 17 and with a seat 32 on a bushing 33 loosely surrounding the valve stem 34. The valve 27 floats between the valve seats 30 and 32 and thereby controls the pressure in a line 35 leading from a chamber 36 around the valve seats to a fluid motor 37 which operates a control member for applying an actuating force to the controlled quantity changing the value of the controlled quantity, for example, a valve 37a having a stem 37b connected to the diaphragm 37c of the fluid motor 37. The fluid pressure delivered to the fluid motor 37, which corresponds to the difference between the measured value of the controlled quantity and the set point or desired value of the controlled quantity, is accordingly utilized to change the setting of the control member for the controlled quantity and to thereby introduce a correction in the direction to return the controlled quantity to the desired or set point value.

Upon changes in pressure in the passageway 19, due to deviations in the measured value of the controlled quantity from the desired or set point value, the bellows 21 initially moves the valve 27 in the direction to produce a change in the pressure in the line 35 in the direction to cause operation of the motor 37 to bring the controlled quantity back to the desired value. For example, upon an increase in the magnitude of the controlled quantity, the motor 37 would actuate the valve stem 37b in the direction to decrease the magnitude of the controlled quantity. In other words, the bellows 21 acts initially to produce a change in pressure in the line 35 in the direction to compensate for deviations in the measured value of the controlled quantity from the desired or set point value.

The bellows 26 which is larger and more sensitive than the bellows 21, is fed from the way 20 through a needle valve 38 which introduces an adjustable time lag between the response of the bellows 26 and the response of the bellows 21. That is, the initial compensating action of the bellows 21 is followed up by a delayed compensating action of the bellows 26. The bellows or diaphragms 21 and 26 comprise a control pressure relay. The sensitivity of the relay is adjustable by the needle valve 38 which permits matching of the time lag or sensitivity of the relay to the system.

Instead of the control pressure relay illustrated in Fig. 1 which is described in greater detail in application Serial No. 108,775, filed August 5, 1949, it is possible to substitute in the Fig. 1 system the less elaborate control pressure relay illustrated in Fig. 2. The Fig. 2 control pressure relay has a passageway 19a supplied from the fluid pressure line 17 through a restricted orifice 18a, which supplies a substantially constant fluid flow to the nozzle 16. The pressure at the nozzle 16 which appears in the passageway 19a is fed through a way 20a to the interior of a bellows 21a carried by a rigid wall 22a. The bellows 21a has an end plate 25a which carries a valve 27a having oppositely facing conical faces 28a and 29a respectively cooperating with a seat 30a in a way 31a leading from the fluid pressure supply 17 and with a seat 32a on a bushing 33a loosely surrounding the valve stem 34a. The valve 27a floats between the valves 30a and 32a and thereby controls the pressure in the line 35 leading from the chamber 36a around the valve seats to the fluid motor 37. The less elaborate control pressure relay illustrated in Fig. 2 likewise produces a control pressure in the line 35 leading to the motor 37, which corresponds to the relative position of the nozzle and flapper 15, 16.

The function of the control pressure relays illustrated, or of the other control pressure relays which could be substituted in the Fig. 1 system, is to produce a control pressure corresponding to the nozzle and flapper separation.

Since the nozzle and flapper separation corresponds primarily to the deviation of the measured value of the controlled quantity from the desired or set point value, the control pressure produced by the control pressure relay corresponds to the magnitude of the deviation of the controlled quantity from the desired or set point value. The mechanical linkage illustrated in Fig. 1 produces a small variation in flapper position under steady state conditions due to the fact that the different lever 9 is in line with the fixed pivot 5 and the motion of the differential lever transmitted to the flapper is due to the angular motion of the differential lever about the fixed pivot 5. When the pivot 14 is close to the pivot 5, a large variation in the angularity of the differential lever 9 results in a small variation in the flapper position.

While the flapper position is essentially, or almost constant under steady state conditions, there is a substantial variation in flapper position under transient conditions. Movement of the pen arm 3 away from the position set by the direct set pointer 7 causes movement of the differential lever 9 to one side of the fixed pivot 5 thus producing a much larger change in the nozzle pressure than the full range of steady state nozzle pressures. This greater change in nozzle pressure can be explained as due to the difference between the pivoting of the differential lever 9 about the pivot 5 and about the lower end of the arm 8; pivoting about the lower end of the arm 8 obviously results in the greater change in flapper position and resultant nozzle pressure. This means that a small movement of the pen arm 3 from the desired position indicated by the direct set pointer 7 results in a large transient change in nozzle pressure.

Under steady state conditions, when the measured value of the controlled quantity indicated by the pen arm 3 corresponds exactly with the operating point indicated by the direct set pointer 7, there is no feed back of the control pressure from the motor 37 to the flapper 15. Under these conditions the pressure in the motor 37 corresponds precisely to the nozzle and flapper separation which is determined by the operating point.

However, under transient conditions, when the nozzle and flapper separation varies widely, it is desirable that there be a feed back from the control pressure fed to the motor so as to introduce a temporary compensation or throttling which will gradually reduce as the measured value of the controlled quantity returns to correspondence with the direct set operating point. The compensation in the present Fig. 1 construction is effected by changes in the motor position, or perhaps more accurately by a correction proportional to the deviation of the motor position which correction is at a rate proportional to the deviation and decreases with the elapsed time. No compensation or correction is introduced under steady state conditions.

The effect of the change in motor position is fed back to the flapper 15 in two ways: (1) by the throttling bellows 39 which moves the flapper in reverse direction from its initial transient movement and (2) by the change in the indication in the sensitive measuring element 1 (or in the pressure appearing in the bellows 1a from the sensitive element transmitter) which reflects, or indicates the compensating action resulting from the change in motor position. The bellows 39 is supplied by a line 40 connected to a cylinder 41. The line 40 has an adjustable restriction 42 which vents to atmosphere so that under steady state conditions, the pressure in the bellows 39 is atmospheric. Changes in the pressure in the bellows 39 above and below atmospheric are effected by a lever 42a having one end carried on a fixed pivot 42b and the other end pivoted at 42c to the valve stem 37b. A connecting rod 43 adjustably connected along the length of the lever 42a transmits the desired proportion of the movement of the valve stem 37b to a piston 44 in the cylinder 41. The movement of the piston 44 corresponding to changes in the position of the valve stem 37b appear in the bellows 39 as the result of movement of the piston 44 in the cylinder 41. Initially, the change in pressure in the bellows 39 corresponds exactly to the movement of the piston 44 and acts in the direction to move a lever 45 about an adjustable pivot 46 slidable on the lever 45 and on a stationary guide 47. When the pivot is fixed at the upper end of the lever 45, the bellows 39 has no effect. When the pivot 46 is fixed or adjusted at some intermediate point on the lever 45 the change in pressure in the bellows 39 causes an initial movement of the flapper 15 in the sense to oppose the movement of the flapper by the differential lever 9. This action of the bellows 39 is only present during transient changes. As the pressure in the bellows 39 returns to atmospheric due to bleeding through the adjustable restriction 42, the flapper is returned to the position determined by the differential lever 9. Under very slow changes the pressure in the bellows 39 is at all times atmospheric and there is no compensating action introduced. From one aspect, the bellows 39 is a throttling bellows which is reset at a rate determined by the restriction 42. Because the pressure in the bellows 39 results solely from changes in the motor position, the throttling action is in no way dependent upon the control pressure for operating the motor. The throttling action of the bellows 39 results solely from changes in pressure in the cylinder 41 at a rate in excess of the bleed permitted by the restriction 42. This is different from previous arrangements in which attempts have been made to modify the control pressure and in which servo mechanism has been interposed between the control pressure and the motor in order to more accurately position the motor. In the present arrangement, no compensation is introduced until the motor has moved. This permits the use of larger initial control pressures for operating the motor which is convenient in the case of friction loads caused by sticky valve stems. Furthermore, by having the compensation tied into the changes in the motor position, there is a reduction of the delay time between deviations of measurement from the operating point and the actual control action corresponding to this deviation. The tying of the compensation to the changes in the motor position also eliminates the phenomenon in the nature of hysteresis which, when present, prevents accurate positioning of the motor since the motor position can differ for the same control pressure in the line 35 depending upon whether the pressure was increasing or decreasing. From one aspect, the response of the air controller is directly adjusted by the piston 44 and associated parts connected to and movable with the movable member or valve stem 37b which applies an actuating force through the valve 37a to the controlled quantity.

In Fig. 3 is shown a modification especially designed for location remote from the controller. In this modification the line 1b from the sensitive element transmitter which transmits a pressure corresponding to the measured value of the controlled quantity is fed to a chamber 48 between diaphragms 49 and 50, the diaphragm 49 being loaded by a spring 51 and being larger than the diaphragm 50. The line 6b from the set point transmitter which transmits a pressure corresponding to the operating or set point for the controlled quantity is fed to the chamber 51a between the diaphragm 50 and the larger diaphragm 52 which is loaded by a spring 53. The underside of the diaphragm 49 is exposed to atmospheric pressure and the upper side of the diaphragm 52 is connected to atmospheric pressure through an adjustable restriction 54 so that under steady state conditions when the set point and sensitive element transmitted pressures are equal the upper side of the diaphragm 52 is exposed to atmospheric pressure. All three diaphragms 49, 50 and 52 are connected together by a center pin 55 the lower end of which cooperates with a nozzle 56 corresponding to the nozzle 16 in the Fig. 1 construction. The separation of the pin 55 from the nozzle, which corresponds to the separation of the flapper 15 from the nozzle 16 in the Fig. 1 construction, determines the nozzle pressure, which when fed to a control pressure relay produces a control pressure in line 35 to the fluid pressure motor 37. Under steady state conditions, the separation of the pin 55 from the nozzle 56 remains essentially constant varying only slightly with the increase and decrease of the transmitted pressures from the set point transmitter and from the sensitive element transmitter.

While the control pressure relay shown in Fig. 2 could be used in the Fig. 3 system, the control pressure relay there illustrated is that shown in application Serial No. 108,775. In this relay the air pressure supply 17 is connected to a way 57 leading to a chamber 58 containing a valve 59 having oppositely facing conical faces 60 and 61 respectively cooperating with a seat 62 controlling the flow of pressure from the way 57 and a seat 63 exhausting to atmosphere. The valve is normally biased by a compression spring 64 against the seat 62. Under operating conditions the valve floats in a position intermediate to seats 62 and 63 and thereby produces a control pressure in a way 65 leading to the control pressure line 35. The valve 59 has a stem 66 extending through a slightly larger passageway 67 into a chamber 68 equivalent to that produced by the orifice 18a in the Fig. 2 control pressure relay. Since there is a continual back and forth or reciprocating movement of the stem 66 in the passageway 67, the tendency to clogging of the passageway is substantially eliminated. From one aspect the stem 66 and the passageway 67 provide a self-cleaning pressure reducing orifice supplying the chamber 68. A way 69 leading from the chamber 68 conducts this reduced pressure to the nozzle 56. As in the previously described control pressure relay, the pressure in the chamber 68 is controlled by the separation of the pin 55 from the nozzle 56. The pressure within the chamber 68 acts on an impervious diaphragm 70 which may be rubber or other suitable material. Bonded to the rubber at the center is a metal plug 71, the upper end of which contacts the lower end of the valve stem 66. Extending through the plug 71 is a fine hole 72, which provides a restricted flow from the chamber 68 into a large chamber 73 across the top of which is a larger diaphragm 74 having a metal plug 75 bonded at its center. The upper side of the plug 75 has a projection 76 which abuts a similar projection 77 on the under side of the plug 71. The lower side of the diaphragm 74 is closed by a cover 78 carrying an adjusting screw 79. The screw 79 is hollow and slidably carries therein the pin 80 which is free to move upward but has its downward movement restricted by a pin 81 extending through the pin 80 and received in slots 82 in the adjusting screw 79. The upper end of the pin 80 bears on a cap 83 at the lower end of a compression spring 84. The spring 84 normally holds the plugs 75 and 71 in engagement and against the lower end of the valve stem 66. The amount of force exerted by the spring 84 is adjusted by the screw 79.

Under some conditions it is desirable that the valve completely shut off the exhaust so that the out-put pressure fed to the control pressure line 35 can be manually controlled by varying the supply pressure 17. This is accomplished by pushing the adjusting pin 80 upward until the pin 81 is clear of the slots 82 and then turning the pin through a quarter turn. This sufficiently increases the compression of the spring 84, so that the valve 59 is held shut against the exhaust seat 63. This change is effected without changing the adjustment of the adjusting screw 79.

Under steady state conditions when the pin 55 occupies a fixed position relative to the nozzle 56, the pressure in the chambers 68 and 73 equalizes through the fine hole 72 and the position of the valve 59 is determined by the force exerted by the nozzle pressure on the diaphragm 74. Under transient conditions, when the nozzle pressure is subject to wide variations due to changes in position of the pin 55, the pressure in the chamber 68 is substantially instantaneously responsive to the change in nozzle pressure while the pressure in the chamber 73 lags behind the nozzle pressure. Under transient conditions, the small diaphragm 70 is at first fully effective to change the position of the valve 59 and thereby start to alter the outlet or control pressure in accordance with the change in the nozzle pressure. Of course, as the pressure in the chambers 68 and 73 equalize through the fine hole 72, the large diaphragm 74 comes progressively into play. If the change in nozzle pressure is in the direction to increase the pressure in the chamber 68 the small diaphragm 70 moves downward with the large diaphragm 74. If the change in nozzle pressure is in the direction to decrease the pressure in chamber 68 and the decrease is large enough, the small diaphragm may actually move away from the large diaphragm. Having the small diaphragm free to move away from the large diaphragm permits a quicker response which is advantageous in transient conditions.

The control pressure relay shown in Fig. 3 continues the features of the control pressure relay illustrated in Fig. 1 of having a quick acting, less sensitive diaphragm supplemented by a slow acting, more sensitive diaphragm to control the position of the valve. The sensitivity of the diaphragm can be expressed as the ratio of the change in out-put pressure to the change in nozzle pressure. The large diaphragm (exemplified in the Fig. 1 relay by the bellows 26) ordinarily will have a sensitivity as measured by the ratio of change in the control pressure to the change in nozzle pressure of from 10 to 20 times the sensitivity of the small diaphragm.

The control pressure relay, just described, can of course be substituted in the Fig. 1 control.

As in the Fig. 1 control, the control pressure acts on the fluid pressure motor 37 in the direction to bring the controlled quantity back to the operating or set point. Where the fluid pressure motor controls a valve, the position of the motor will be represented by the valve stem 37b.

The arrangement for feeding back the movement of the valve stem 37b comprises a bracket 85 fixed to the valve stem and connected by a link 86 to a lever 87 pivoted at 88. The lever 87 carries a valve 89 which cooperates with a diaphragm 90 loaded by a spring 91. The diaphragm 90 forms the upper wall of a chamber 92 fed from a compressed air line 93 through a restriction 93a. With this arrangement, the pressure in the chamber 92 corresponds to the position of the valve stem 37b. Upon changes in position of the valve stem, the valve 89 changes the rate of bleed and thereby causes a movement of the diaphragm until the pressure balances the spring 91. The pressure from the chamber 92 flows through a way 94 and is divided in a proportion determined by an adjustable valve 95 between a way 96 leading to a chamber 97 and a way 98 leading to the atmosphere. The chamber 97 is on the upper side of a flexible diaphragm 99 loaded by a spring 100. The diaphragm 99 corresponds to the piston 44 in the Fig. 1 construction. Upon sudden movement of the valve stem 37b there accordingly is a sudden change in the pressure in the chamber 92 which is fed through the ways 94 and 96 and causes a corresponding sudden change in pressure in the chamber 97 on the upper side of the diaphragm 99. The lower side of the diaphragm 99 forms the upper wall of a chamber 101 which is connected through a way 102 to a chamber 103 on the upper side of the diaphragm 52. The way 102 is connected through a passageway 104 which bleeds to atmospheric pressure through the restriction 54. Upon a sudden movement of the diaphragm 99 either up or down there is produced in the chamber 103 a pressure respectively below and above atmospheric which lasts for a length of time depending upon the restriction 54. Since under steady state conditions, when the pressure in the chamber 103 is atmospheric the pin 55 has the proper separation from the nozzle 56 so as to produce a control pressure exactly corresponding to the operating point of the controlled quantity, it is evident that raising or lowering the pressure in chamber 103 will produce a substantial movement of the pin 55. This movement is in the direction to initially compensate for the movement of the valve stem 37b, but the amount of compensation is gradually reduced by bleeding through the restriction 54 so that as the valve stem 37b reaches the correct position for steady state operation the compensation is entirely removed.

For example, if the controlled quantity should suddenly drop below the operating point as determined by the set point transmitter, there would be a corresponding reduction in the pressure in line 1b from the sensitive element transmitter and a corresponding upward movement of the pin 55 due to the reduction in pressure in the upper side of the diaphragm 49, there being no change in the pressure on the diaphragms 50 and 52. The separation of the pin 55 from the nozzle 56 caused by its upward movement results in a decrease in nozzle pressure which decreases the pressure in the chamber 68 and accordingly causes an upward movement of the valve 59 resulting in an increase in the control pressure in the line 35 due to the restriction of the bleed through the seat 63. The increase in pressure in the line 35 causes a downward movement of the valve stem 37b to open the valve 37a wider and to increase the value of the controlled quantity. Until there is an actual movement of the valve stem 37b, there is nothing to change the position of the pin 55. Upon downward movement of the valve stem 37b there is an upward movement of the valve 89 which raises the pressure in the chamber 92 and causes an increased pressure to be transmitted through the ways 94 and 96 to the upper side of the diaphragm 97. The increased pressure causes the diaphragm 97 to collapse and produces a greater than atmospheric pressure on the upper side of the diaphragm 52. This greater than atmospheric pressure on the upper side of the diaphragm 52 compensates for the decrease in pressure on the upper side of the diaphragm 49 and accordingly tends to move the pin 55 back toward the nozzle 56. As the pressure in the chambers 101 and 103 bleeds to atmosphere through the restriction 54, the compensation or throttling action due to above atmospheric pressure on the upper side of the diaphragm 52 is removed and the pin 55 is permitted to return or to be reset to the position determined by the difference between the set point and sensitive element transmitter pressures. Since the bleed to atmosphere through the restriction 54 is related to the time required for the valve 37a to restore the controlled quantity to the operating point, the removal of the compensating action caused by the bleeding of pressure in chambers 101 and 103 to atmosphere does not take place until the controlled quantity has returned to the operating point.

The Fig. 3 control continues the advantage of the Fig. 1 control of having the motor control pressure dependent upon the deviation of the controlled quantity from the set or operating point and of having the compensation or throttling action decreasing the sensitivity or response of the control dependent upon the movement of the fluid pressure motor operated by the control pressure. By tying the sensitivity compensation to the motor position, the effect of hysteresis is eliminated. Furthermore, it is possible to operate the control on its high gain range for a longer time and thereby obtain a quicker actual correction for deviations in the controlled quantity from the operating point.

In all of the controls, there is a multiple feed back to the controller nozzle and baffle (15, 16 Fig. 1; 55, 56 Fig. 3). Changes in measurement of the controlled quantity are fed back by the measuring instrument 1 or through the line 1b from the measurement transmitter.

There obviously is some delay in measuring and in receiving changes in measurement. The other feed back is from changes in the motor position (37b) which is much quicker than the feed back from measurement. The feed back from changes in motor position, while initially much faster than the feed back from measurement, is reset to zero at a rate which is substantially equal to or less than the response time for the measuring instrument and its transmitter. When the change in the controlled quantity has been reflected by measurement, the feed back from the change in motor position has been completely or at least partly reset to zero. This prevents instability or hunting. If the reset time for the feed back from changes in motor position were shorter than the response time for measurement of changes in the controlled quantity there would be a tendency toward instability.

The term "bellows" is used to include diaphragms.

What I claim as new is:

1. In a control, a transmitter producing a pressure corresponding to the measured value of a controlled quantity, a transmitter producing a pressure corresponding to the set or operating value of the controlled quantity, a controller for producing a control pressure corresponding to the difference between the transmitted pressures, a motor fed from the control pressure actuating an element varying the controlled quantity, a pneumatic means for changing the sensitivity of the controller, means actuated by changes in the motor position for producing a corresponding change in pressure, means instantaneously feeding the change in pressure to the pneumatic means in the sense to decrease the sensitivity of the controller, and time delay means gradually disabling the sensitivity reduction of the controller.

2. In a control, a controller for producing a control output pressure corresponding to the difference between the measured and set or operating values of a controlled quantity, a motor fed from the control output pressure actuating an element varying the controlled quantity, a pneumatic means for changing the sensitivity of the controller, means actuated by changes in the motor position for producing a corresponding change in pressure, means instantaneously feeding the change in pressure to the pneumatic means in the sense to decrease the sensitivity of the controller, and time delay means gradually disabling the sensitivity reduction of the controller.

3. In a control, a controller for producing a control output pressure corresponding to the difference between the measured and set or operating values of a controlled quantity, a motor fed from the control output pressure actuating an element varying the controlled quantity, a pneumatic means including a bellows for changing the sensitivity of the controller, an expansible chamber, means actuated by changes in the motor position for producing a corresponding change in the volume of the chamber with a resultant change in pressure in the chamber, means instantaneously feeding the change in pressure in the chamber to the bellows in the sense to decrease the sensitivity of the controller, and a restricted bleed from the chamber gradually disabling the sensitivity reduction of the controller due to changes in the pressure in the expansible chamber with its changes in volume.

4. In a control, a controller for producing a control output pressure corresponding to the difference between the measured and set or operating values of a controlled quantity, a motor fed from the control output pressure actuating an element varying the controlled quantity, a pneumatic means for changing the sensitivity of the controller, means actuated by changes in the motor position for producing a corresponding change in pressure, means instantaneously feeding back to the pneumatic means, in the sense to decrease the sensitivity of the controller, the change in pressure corresponding to the changes in motor position, and time delay means gradually counteracting the feed back of the changes in pressure corresponding to the changes in motor position.

5. In a control, a controller for producing a control output pressure corresponding to the difference between the measured and set or operating values of a controlled quantity, a motor fed from the control pressure actuating an element varying the controlled quantity, means for changing the sensitivity of the controller, means actuated by changes in the motor position for producing a control impulse, means instantaneously feeding the control impulse to the sensitivity changing means in the sense to decrease the sensitivity of the controller, and time delay means gradually disabling the control impulse.

References Cited in the file of this patent

UNITED STATES PATENTS

| Number | Name | Date |
|---|---|---|
| 2,303,752 | Meredith | Dec. 1, 1942 |
| 2,372,345 | Temple | Mar. 27, 1945 |
| 2,409,871 | Krogh | Oct. 22, 1946 |
| 2,484,557 | Eckman | Oct. 11, 1949 |
| 2,487,266 | Newell | Nov. 8, 1949 |
| 2,516,333 | Moore | July 25, 1950 |